(12) United States Patent
Vuillaume et al.

(10) Patent No.: US 8,291,229 B2
(45) Date of Patent: Oct. 16, 2012

(54) SYSTEM AND METHOD FOR DIGITAL SIGNATURES AND AUTHENTICATION

(75) Inventors: Camille Vuillaume, Tokyo (JP);
Katsuyuki Okeya, Sagamihara (JP);
Erik Dahmen, Darmstadt (DE)

(73) Assignee: Hitachi, Ltd., Tokyo (JP)

( * ) Notice: Subject to any disclaimer, the term of this patent is extended or adjusted under 35 U.S.C. 154(b) by 938 days.

(21) Appl. No.: 12/335,683

(22) Filed: Dec. 16, 2008

(65) Prior Publication Data

US 2009/0187766 A1 Jul. 23, 2009

(30) Foreign Application Priority Data

Jan. 17, 2008 (JP) ................. 2008-007849

(51) Int. Cl.
*H04L 9/34* (2006.01)
*H04L 29/06* (2006.01)
*H04L 9/28* (2006.01)

(52) U.S. Cl. .......... 713/176; 380/28; 713/165; 713/167; 713/170

(58) Field of Classification Search .................. None
See application file for complete search history.

(56) References Cited

U.S. PATENT DOCUMENTS

| | | | | |
|---|---|---|---|---|
| 5,032,708 A | * | 7/1991 | Comerford et al. | 235/492 |
| 6,259,126 B1 | * | 7/2001 | Hsu et al. | 257/298 |
| 6,608,792 B2 | * | 8/2003 | Pitts | 365/225.7 |
| 6,898,625 B2 | * | 5/2005 | Henry et al. | 709/206 |
| 2003/0221109 A1 | * | 11/2003 | Boyer et al. | 713/176 |
| 2005/0091261 A1 | * | 4/2005 | Wu et al. | 707/102 |

OTHER PUBLICATIONS

Amos Fiat. Adi Shamir: How to Prove Yourself: Practical Solutions to Identification and Signature Problems, CRYPTO 1986: 186-194.
Ralph C. Merkle: A Certified Digital Signature. CRYPTO 1989: 218-238.

* cited by examiner

*Primary Examiner* — Philip Chea
*Assistant Examiner* — Fatoumata Traore
(74) *Attorney, Agent, or Firm* — Antonelli, Terry, Stout & Kraus, LLP.

(57) ABSTRACT

A system and method for authentication and digital signatures on memory-only supports, comprising a read-once memory unit storing secret arrays, whose contents are destroyed upon reading, a standard memory unit storing encrypted arrays, tree data authenticating the encrypted arrays to one single public key, and a certificate of the public key issued by a certificate authority. The memory support sends its public key and certificate to a verifier, receives a challenge which is signed by elements from secret arrays in the read-once memory. The verifier system checks the authenticity of the data revealed from the read-once memory by encrypting it and comparing the result to one of the encrypted arrays, and verifies that the encrypted array authenticates to the public key using tree data. Finally, the verifier checks the authenticity of the public key using the certificate.

15 Claims, 12 Drawing Sheets

FIG.3
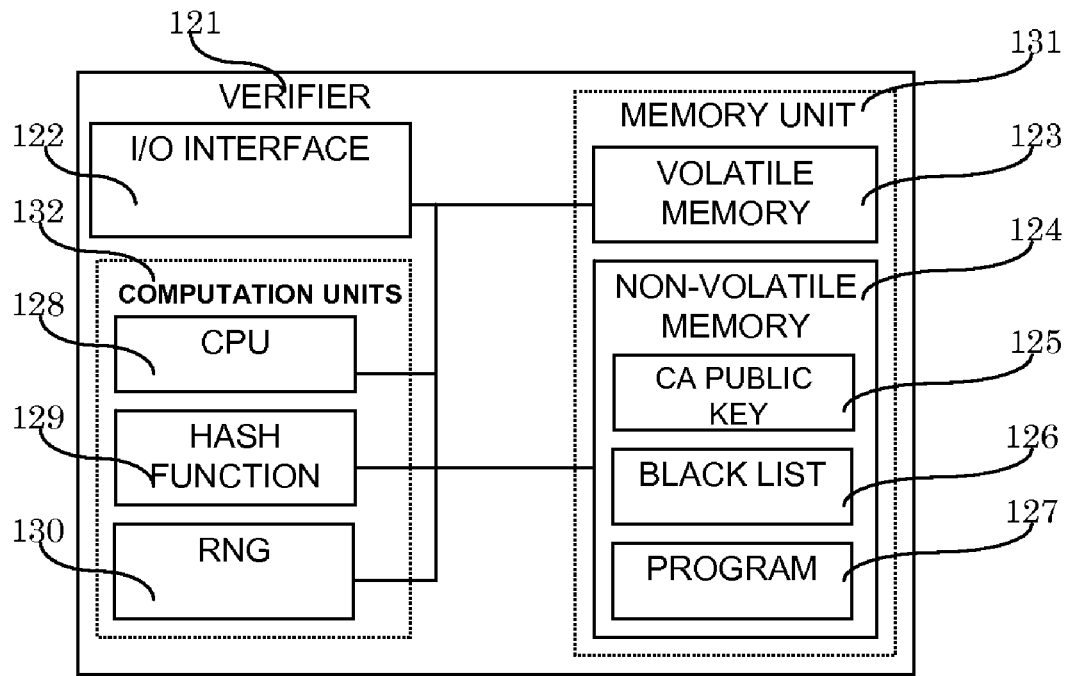
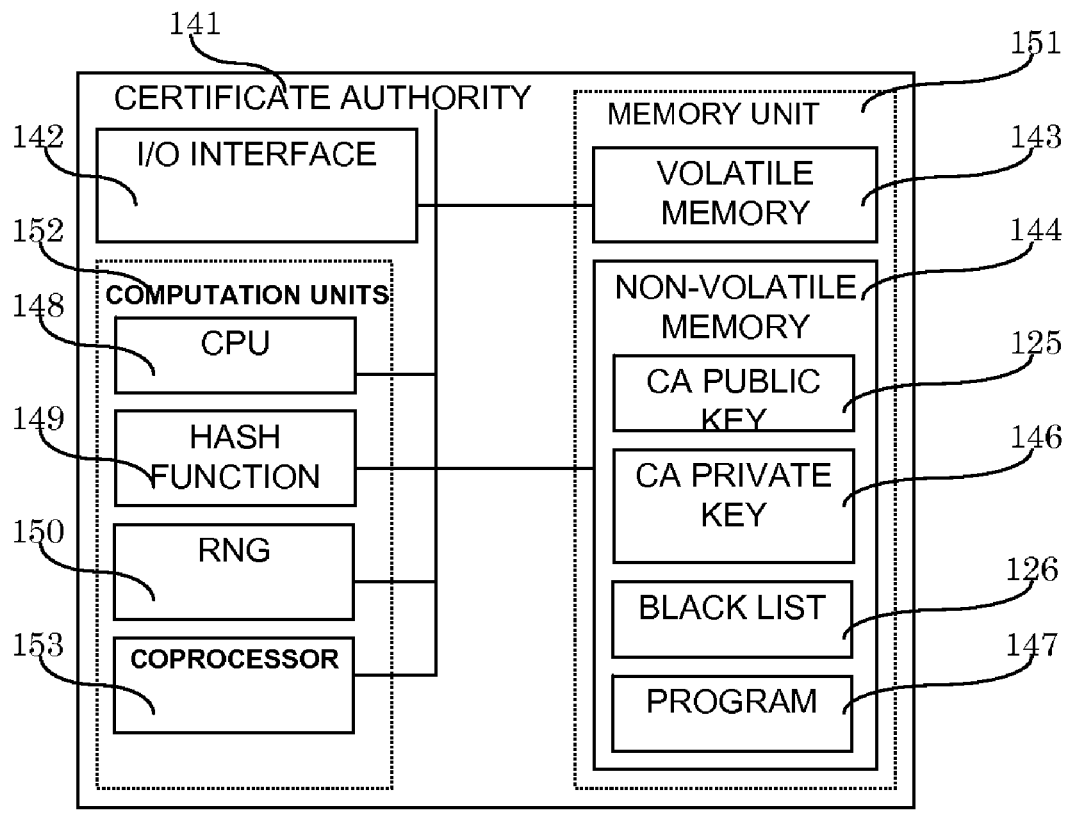

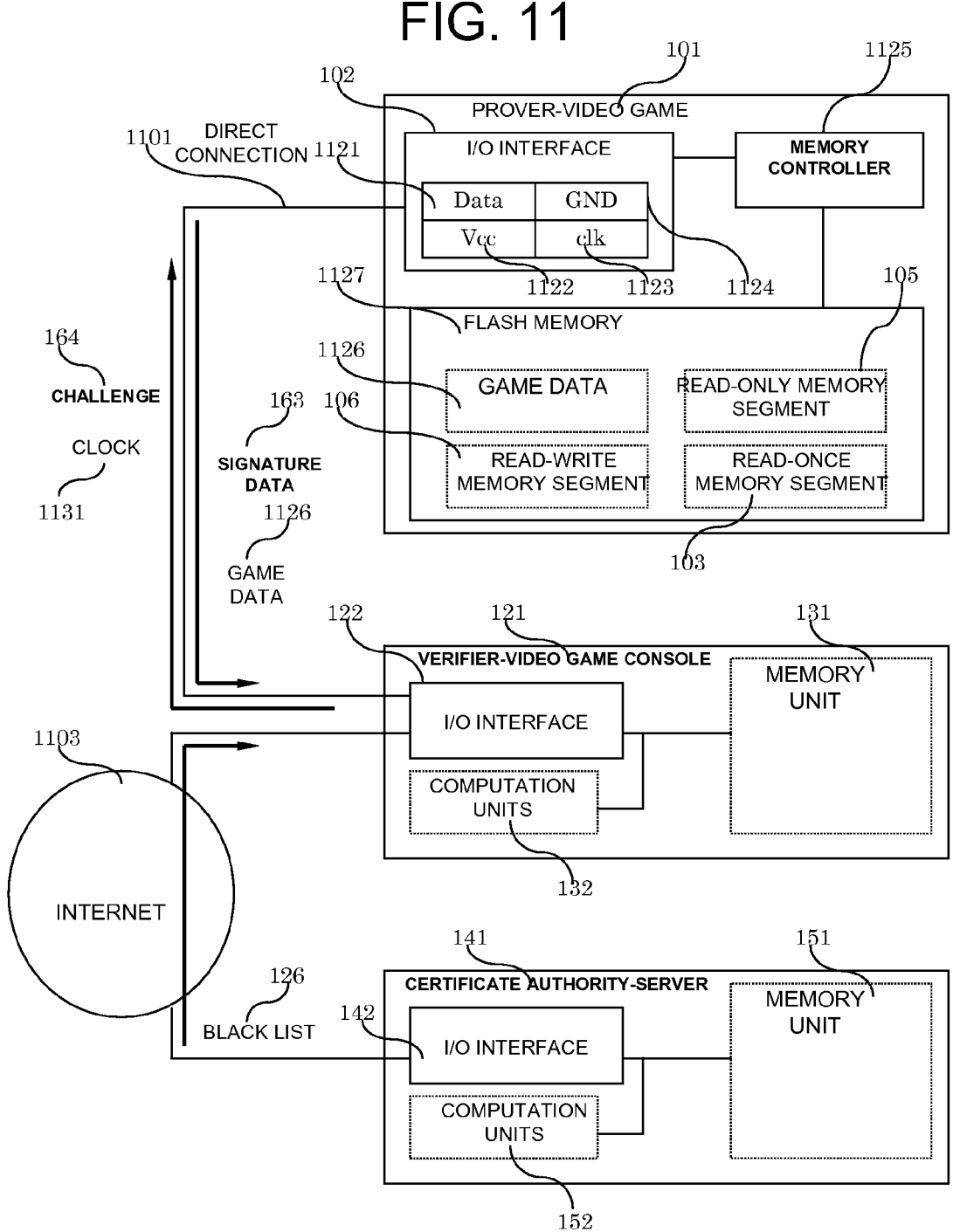

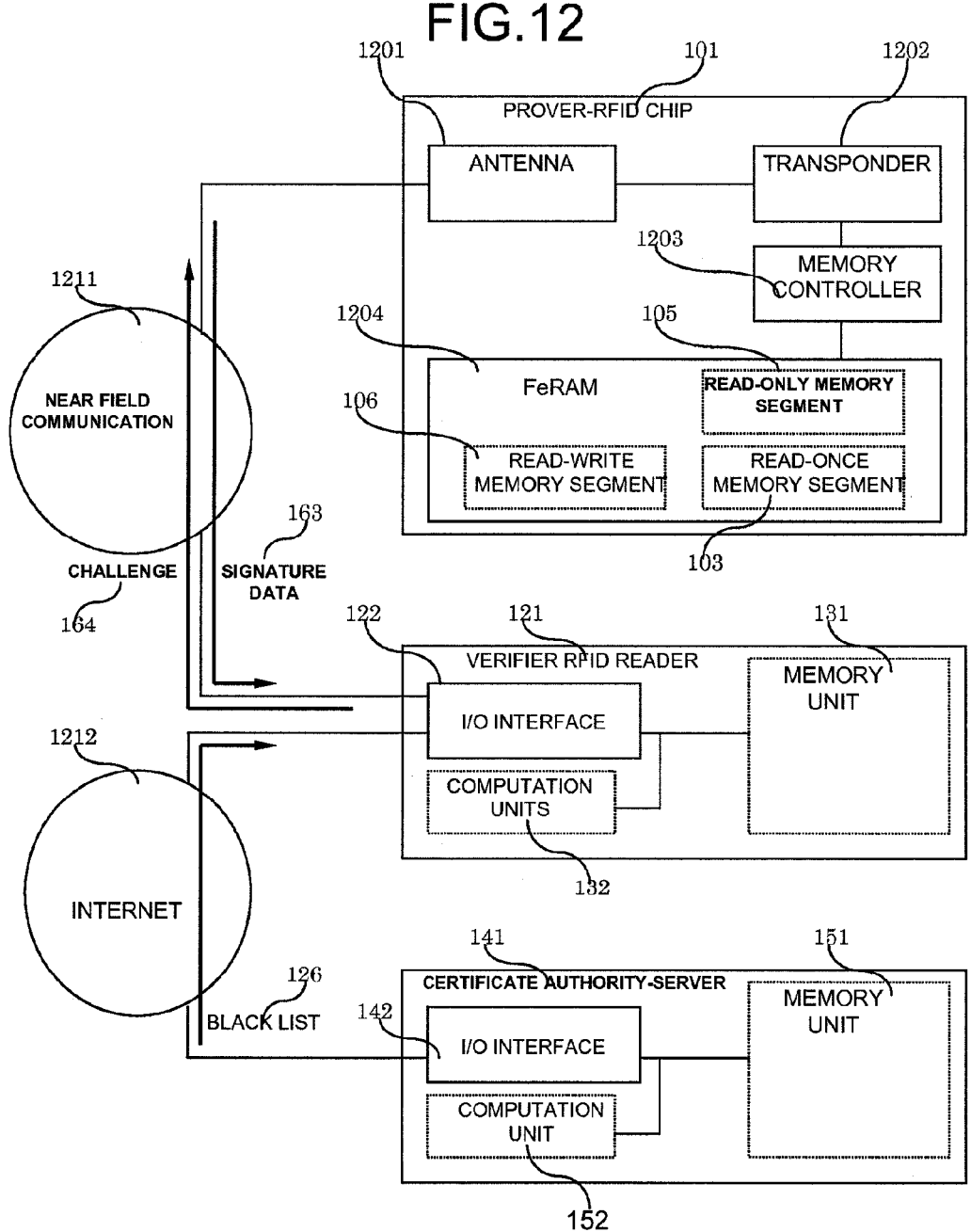

SYSTEM AND METHOD FOR DIGITAL SIGNATURES AND AUTHENTICATION

INCORPORATION BY REFERENCE

This application claims priority based on a Japanese patent application, No. 2008-007849 filed on Jan. 17, 2008, the entire contents of which are incorporated herein by reference.

BACKGROUND OF THE INVENTION

The present invention relates to a method and apparatus for securely authenticating a device or signing digital contents using a public-key cryptosystem, with an extremely limited computational power or no computation unit at all.

Authentication plays a crucial role for fighting against piracy, unauthorized copying or counterfeiting. For example, it has applications in secure passports, which embed a wireless communication-enabled chip for authenticating the holder of the passport, or for anti-counterfeiting purposes, where authentication chips certify the origin of products. In addition, copyrighted digital media include authentication tokens known as DRM (digital right managements) in order to prevent unauthorized actions such as piracy. As a consequence, their support (CD, DVD, memory cards or other equivalent memory supports) often includes authentication mechanisms. Finally, authentication can be useful to prevent competitors from reverse-engineering a product, and mass-produce it at a cheaper price. For instance, printer cartridges could be equipped with an authentication chip in order to prevent the usage of refill kits or rogue cartridges manufactured by competitors.

Authentication consists of a protocol where a prover exhibits a proof of his identity to a verifier. Usually, the verifier sends a challenge which can be solved by the prover only. When the challenge relies on symmetric key cryptography, the prover and the verifier have to share a common secret key, whereas in the case of public-key cryptography, only the prover owns the secret key, and any verifier can check the solution of the challenge provided by the prover.

It is expected that RFID chips will be widely used for authentication means in a near future; however, the current technology only allows the storage of a tag, that is, a unique ID number, which is broadcasted in clear using a radio transmission. Therefore, anyone listening to the transmission frequency can get the knowledge of the tag and later clone it. Using a protocol based on symmetric-key cryptography is a better solution, since the transmission between the prover and the verifier can be encrypted. However, ID fraud can occur when the verifier is dishonest or compromised, since the secret key is shared by the prover and the verifier. In addition, in most scenarios, one verifier must be able to authenticate many provers; if only one verifier is compromised, all secret keys are revealed and all of the provers will be compromised as well. Besides, in the framework of an anti-counterfeiting system, the verifier might have to be able to authenticate a whole line of products, and not individual products. When the line of products consists of several million of units, storing all keys is prohibitive. In this case, instead of having one secret key per unit, at first sight, having one key for the whole line appears to be a better idea. Unfortunately, compromising only one unit also means compromising the whole line of products.

Alternatively, public-key cryptosystems, and in particular digital signatures, can be used for authentication purposes. The verifier sends a random message to the prover, who signs the message using his secret key. Then, the verifier can check the prover's identity by verifying the signature using the prover's public key only, and not the secret key. An authentication system based on public-key cryptography has the advantage that the verifier cannot impersonate the prover, since he does not know the prover's secret key. In addition, using a public-key infrastructure allows an easy authentication of a line of product: the prover digitally signs the challenge, and provides his public key and a certificate for his public key, which includes a digital signature of the prover's public key, signed by a certificate authority. Then the verifier can verify both signatures in order to confirm the identity of the prover. This approach does not only eliminate the storage requirements of the verifier, which has to store the verification means for the certificate (for example a single public key for a whole product line, where the public key is obtained from the manufacturing company), and not that of individual units, but also includes an easy revocation mechanism. When a prover's secret key is known to be compromised, his public key can be sent in a black list to all verifiers.

Patent literature 1: Liam D. Comerford, Vernon E. Shrauger: "Write-once-read-once batteryless authentication token", US5032708 (IBM), 1991.

Nonpatent literature 2: Amos Fiat, Adi Shamir: How to Prove Yourself: Practical Solutions to Identification and Signature Problems. CRYPTO 1986: 186-194.

Nonpatent literature 3: Ralph C. Merkle: A Certified Digital Signature. CRYPTO 1989: 218-238.

SUMMARY OF THE INVENTION

Authentication systems based on public-key cryptosystems and digital signatures have the following problem: to construct a digital signature, the prover has to possess some computational ability. For most typical digital signature schemes, the required computational ability is significant. However, many platforms which would benefit from an authentication mechanism do not have powerful computational units, and sometimes do not have any computational unit at all; they are pure memory units. For example, CDs, DVDs, removable memory media such as SD cards and other memory cards do not have any CPU, and consist of memory only. Therefore, such platforms cannot take advantage from authentication methods based on public-key cryptosystems.

Patent literature 1 recites an invention which realizes authentication without any computational effort on the prover's side, using a read-once array implemented with fuses. However, the invention requires that the verifier stores a secret key in order to authenticate the response provided by the prover, making it essentially a symmetric-key authentication protocol.

Accordingly, besides the objects and advantages of the invention described in the above patent, one of the objects and advantages of the present invention is to provide a public-key authentication or digital signature mechanism which does not require any computation unit on the prover's side. Further objects and advantages will become apparent from a consideration of the ensuing description and drawings.

The prover has a special memory unit storing secret data, the read-once memory unit. Data stored by this unit consists of several pairs $(U_i, D_i)$ arranged in arrays, wherein only one of the two elements in the pair can be read. After one element of the pair $(U_i, D_i)$ is read, the whole pair is erased from memory.

In addition to the read-once memory, the prover has another memory unit, which stores authentication data which authenticates the pairs $(U_i, D_i)$ to the prover's public key. On the same unit, the prover stores his public key and its certificate. When signing digital data or when responding to a challenge in an authentication protocol, the prover reveals one element $U_j$ or $D_j$ in several pairs, which are destroyed upon reading. The choice of the revealed element is done according to bits of the data to sign or to the challenge. In addition, the prover provides authentication data for the revealed elements.

Since the revealed elements $U_j$ or $D_j$ authenticate to the prover's public key, and since the public key is certified, the prover is able to authenticate himself or sign data by just revealing and transmitting data, without any computation. As a consequence, with memory units and possibly a simple memory controller, the prover gains the ability to use strong public-key cryptographic techniques, which can be used for authentication or generating digital signatures or achieving public-key authentication.

These and other benefits are described throughout the present specification. A further understanding of the nature and advantages of the invention may be realized by reference to the remaining portions of the specification and the attached drawings.

BRIEF DESCRIPTION OF THE DRAWINGS

Those and other objects, features and advantages of the present invention will become more readily apparent from the following detailed description when taken in conjunction with the accompanying drawings wherein:

FIG. 3 is a hardware diagram of a verifier and a certificate authority, according to the first embodiment of the present invention;

FIG. 11 is a hardware diagram of DRM for digital contents on a memory card, according to a third embodiment (Embodiment 3) of the present invention; and FIG. 12 is a hardware diagram of an anticounterfeiting system, according to a fourth embodiment of the present invention.

DETAILED DESCRIPTION OF THE PREFERRED EMBODIMENTS

Hereinafter, embodiments according to the present invention will be fully explained by referring to the attached drawings.

<Embodiment 1> Public-Key Authentication and Digital Signatures on Memory-Only Platforms In this first embodiment, the system consists of at least three distinct elements coupled by a network: at least one prover, at least one verifier and a Certificate Authority. The role of the Certificate Authority is to initialize the data stored in the prover's memory and to issue a certificate for the prover. In addition to that, the Certificate Authority maintains a black list of provers which have been compromised, and regularly broadcasts the black list to all verifiers.

Within the system, any prover can be authenticated by any verifier, using a public-key infrastructure. The system has three parameters:

The security parameter n, which is the size of the challenge to be signed by the prover.

The usability parameter p, which is the number of signatures that can be signed by the prover.

The hash function H and its output size h.

Figure 1:
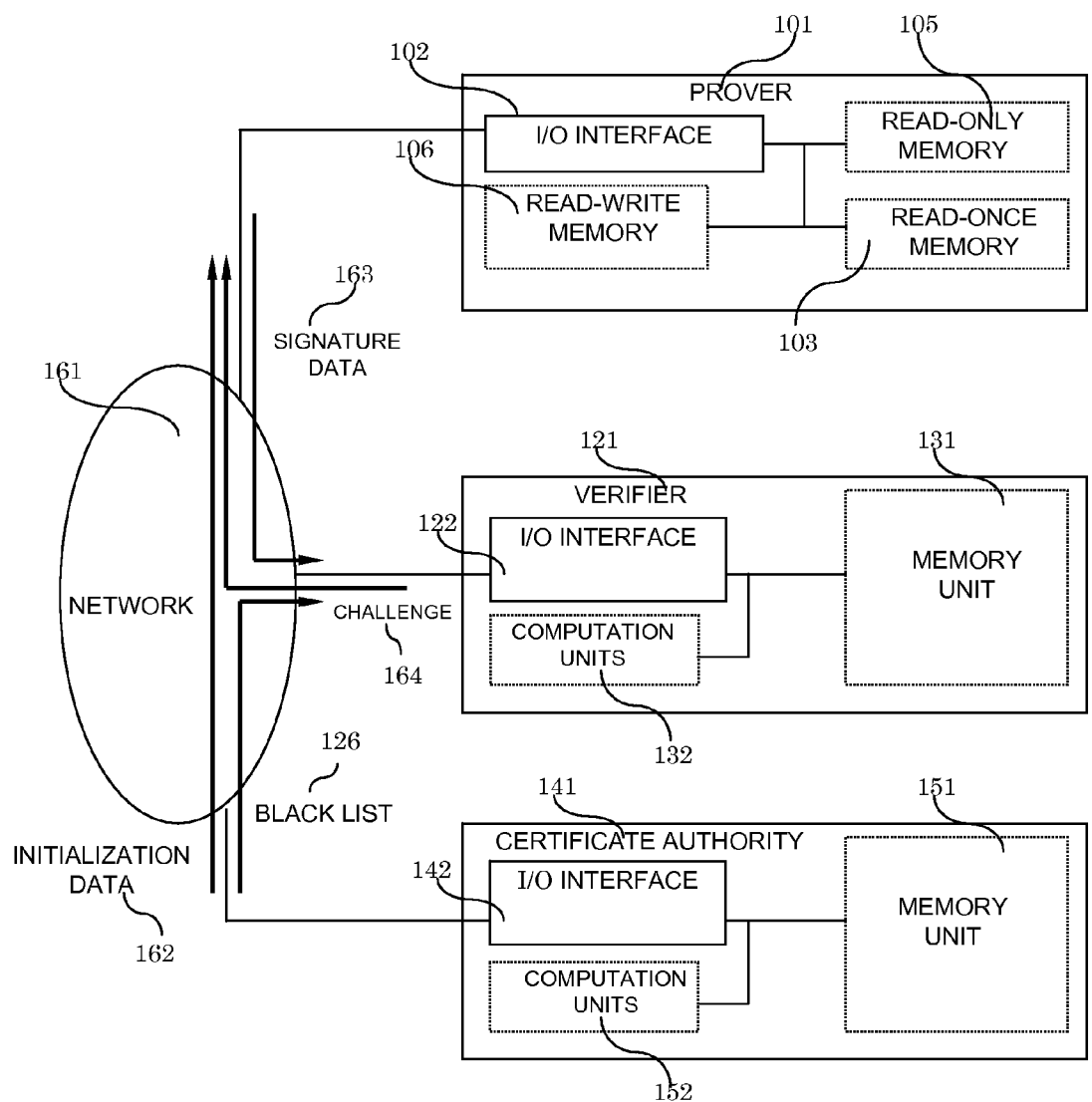
FIG. 1 is a hardware diagram of an authentication system, according to a first embodiment (Embodiment 1) of the present invention.

*Authentication System, FIG. 1*

The system consists of at least one prover 101, which is a memory-only platform, of at least one verifier 121 and a Certificate Authority 141. The prover 101, verifier 121 and Certificate Authority 141 are coupled by a network 161. The prover consists of an input/output interface 102, a read-once memory unit 103, a read-only memory unit 105 and a read-write memory-unit 106. The verifier 121 has an input/output interface 122, computation units 132 and memory units 131. The Certificate Authority 141 has an input/output interface 142, computation units 152 and memory units 151.

The prover and the verifier can engage in an authentication protocol, where the verifier sends a random challenge 164 to the prover, and the prover responds with a digital signature 163 of the challenge. Authentication is successful when the signature is correct. The role of the Certificate Authority 141 is to fill the memory units of the prover with initialization data 162 and issue a certificate of the prover's public key. In addition, the Certificate Authority maintains a black list 126 of compromised public keys, which is regularly broadcasted to all verifiers coupled to the network 161.

Figure 2:
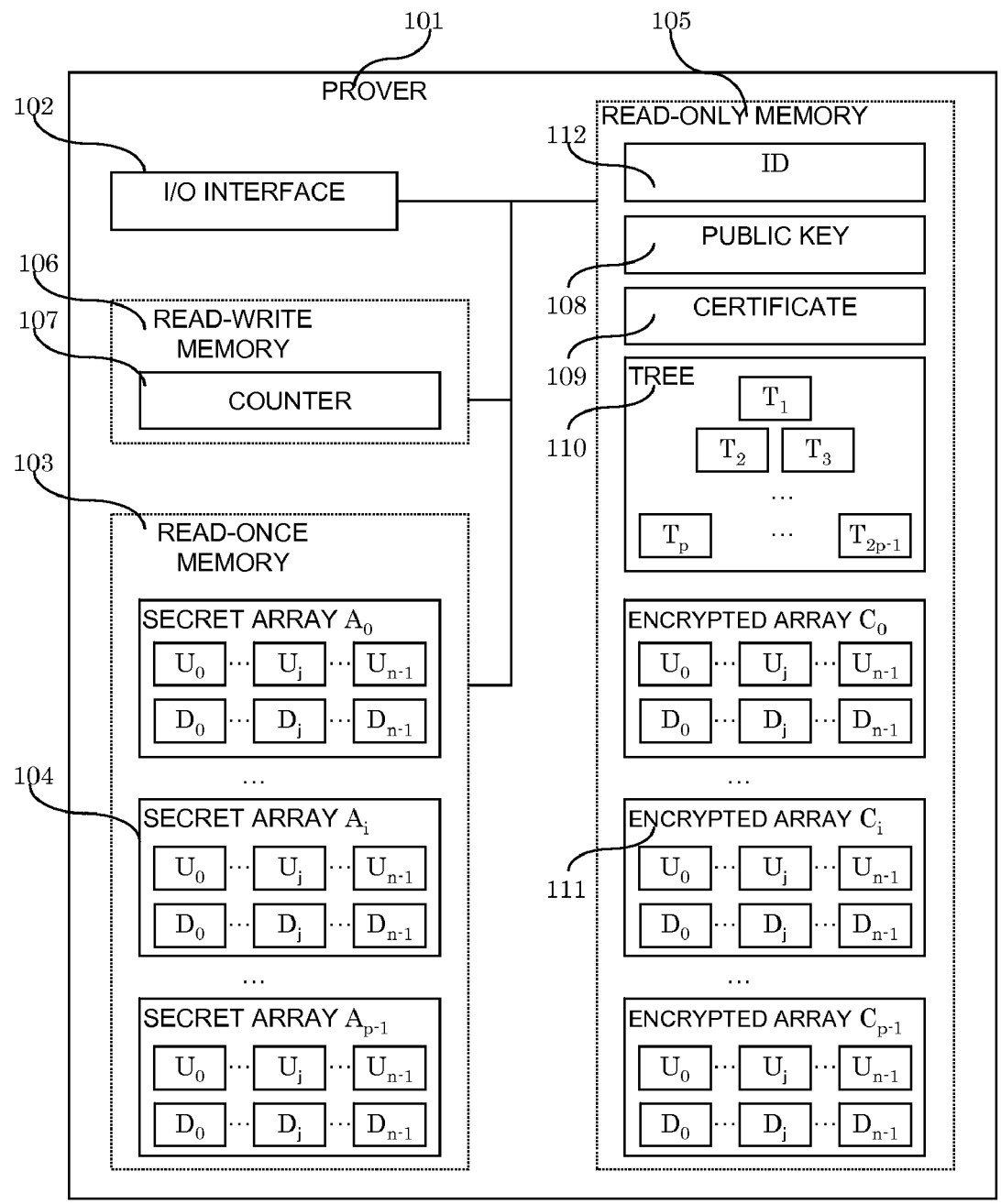
FIG. 2 is a hardware diagram of a prover, according to the first embodiment of the present invention.

*Prover, FIG. 2*

The prover consists of memory units 103, 105 and 106 and an input/output interface 102, without any CPU. The read-once memory unit 103 stores p secret arrays 104, namely $A_0, \ldots, A_{p-1}$, where the data stored in one array can be used for one authentication only. As a consequence, the prover can authenticate only a limited number of times, namely p times. Each secret array 104 consists of 2n data blocks of h bits $U_0 \ldots U_{n-1}$ and $D_0 \ldots D_{n-1}$. Read-once memory is addressed by the index of the array $0<=i<=p-1$ and the index of the data block $0<=j<=n-1$, and the line of the data block, D or U.

Upon reading some data block $U_j$ in array $A_i$, data block $U_j$ is forwarded to the input/output interface 102, and both of $U_j$ and $D_j$ are deleted. Similarly, upon reading $D_j$, both of $U_j$ and $D_j$ are deleted, hence the name read-once memory: the memory contents are destroyed upon reading.

The prover has a read-write memory unit 106 storing a counter 107 with $0<=i<=p-1$, which is used to select the active array. After array $A_i$ has been used for one authentication and its data has been completely erased, the value of counter 107 is updated with i+1.

Finally, the prover has a read-only memory unit 105, where data can be freely accessed without any restriction. This read-only memory unit stores an identification number 112 which uniquely identifies the prover, the prover's public key 108, the certificate 109 for the public key 108 issued by the Certificate Authority 141, a data tree 110 containing 2p-1 data blocks $T_1 \ldots T_{2p-1}$ and p encrypted arrays 111, namely $C_0 \ldots C_{p-1}$. Each encrypted arrays contains 2n data blocks $U_0 \ldots U_{n-1}$ and $D_0 \ldots D_{n-1}$, where one data block $U_j$ or $D_j$ from an encrypted array $C_i$ corresponds to the data block $U_j$ or $D_j$ from the array $A_i$, encrypted with the hash function H, namely $C_i[D_j]=H(A_i$

[$D_j$]) and $C_i[U_j]=H(A_i[U_j])$. For instance, H can be MD5, that is, the same hash function as the verifier's hash function. The encrypted arrays 111 and the data tree 110 can be used to authenticate data blocks from the secret arrays 104 in the read-once memory 103 to the prover's public key 108 by a mechanism that will be explained later.

*Verifier and Certificate Authority, FIG. 3*

The verifier has some computation units, namely a CPU 128 and possibly some cryptographic coprocessor 129, which can compute hash values H(X) for arbitrary-size input X. For example, this hash function can be the well-known MD5, or any other hash function. Recall that hash functions have the property that they can map input data of arbitrary length to a fixed-length output of h bits. In the case of MD5, the hash output size is h=128 bits. In addition to that, the verifier has a random number generator 130 for generating random challenges 164.

The verifier also has an input/output interface 122 for communicating with the prover 101, the Certificate Authority 141 or with other devices through a communication network 161. Finally, the verifier has memory units: volatile memory 123 for storing temporary data and non-volatile memory 129 for storing programs 127, but also the Certificate Authority's public key 125 and a black list 126. The black list contains all public keys that are known to be compromised, and can be updated by the Certificate Authority 141 which broadcasts new black lists during software updates.

The Certificate Authority 141 has essentially the same components as the verifier 121: an input/output interface 142, a CPU 148, a coprocessor for computing hash values 149, a random number generator 150, non-volatile memory 144 storing the Certificate Authority's public key 125, the black list 126 and programs 147, and volatile memory 143. In addition, the Certificate Authority stores its private key 146 in non-volatile memory 144, and might have an arithmetic coprocessor 153 for generating digital signatures and certificates. The role of the Certificate Authority is to generate initialization data 134 for the provers' secret arrays 104, as well as encrypted arrays 111 and tree data 110. In addition, the Certificate Authority can issue certificates 109 for provers' public keys 108. Finally, the Certificate Authority maintains a black list 126 with all compromised public keys. During software updates of verifiers, the black list 126 is broadcasted to all verifiers in order prevent compromised chips from authenticating.

Figure 4:
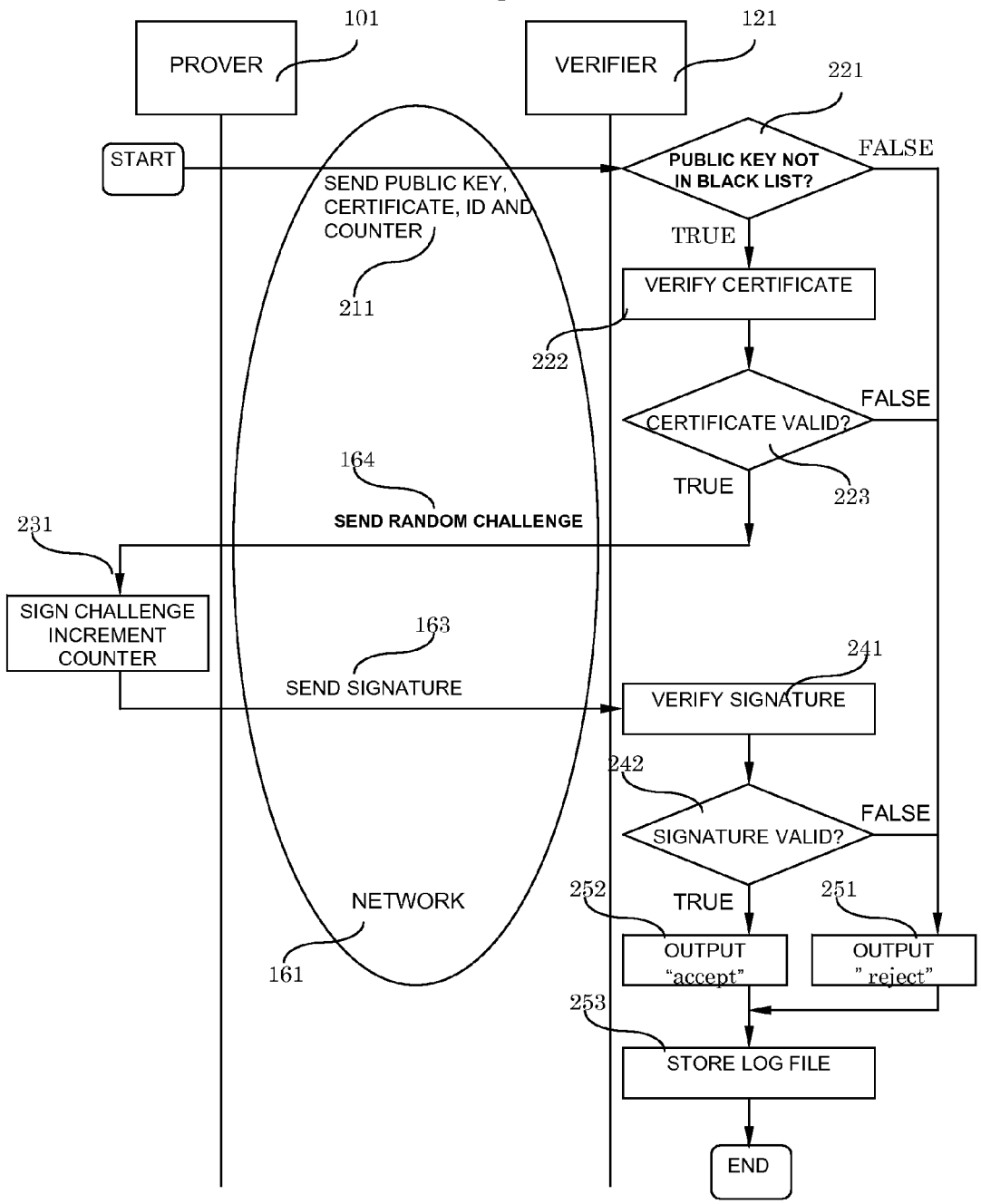
FIG. 4 is a time diagram of authentication protocol, according to the first embodiment of the present invention.

*Authentication Protocol, FIG. 4*

The prover 101 can start the authentication protocol with an authentication request which is sent to the verifier 121 in step 211; this authentication request includes the prover's public key 108, certificate 109, counter value 107 and ID 112. The counter corresponds to the index of some array $A_i$ which has not been used yet.

Next, in step 221, the verifier checks whether the public key 108 is not in the black list 126 of compromised keys; in case the public key is in the black list, authentication is failed. If the public key is not in the black list, the verifier verifies the certificate in step 222. The certificate includes a digital signature of the prover's public key 108, which was signed by the Certificate Authority 141. In case the certificate is not valid, authentication is failed. In the case where the certificate is valid, the verifier sends a random n-bit message 164. This message is the challenge of the authentication protocol, and must be signed by the prover.

After that, the prover signs the challenge by accessing data blocks in array $A_i$ 104, where i is the counter sent in step 211: $U_0$ or $D_0$ depending on bit 0 of the challenge, $U_1$ or $D_1$ according to bit 1 of the challenge, and so on until bit n−1. In addition, the prover sends the corresponding encrypted data block from the encrypted array $C_i$ 111, and elements from the data tree 110 that will authenticate the data blocks from the array $A_i$ 104 to the public key 108. The signature 163 sent by the prover to the verifier consists of the data blocks from $A_i$, $C_i$ and the tree data.

Upon receiving the signature, the verifier verifies the signature in step 241 by checking whether the data blocks from array $A_i$ authenticate to the public key 108, using the encrypted data blocks from $C_i$ and the provided tree data. If the signature is not valid, authentication is failed, otherwise authentication is successful. Finally, in step 253, the verifier writes a log of the protocol, including the result of the authentication (success of failure), the prover's public key and the index used by the prover.

Figure 5:
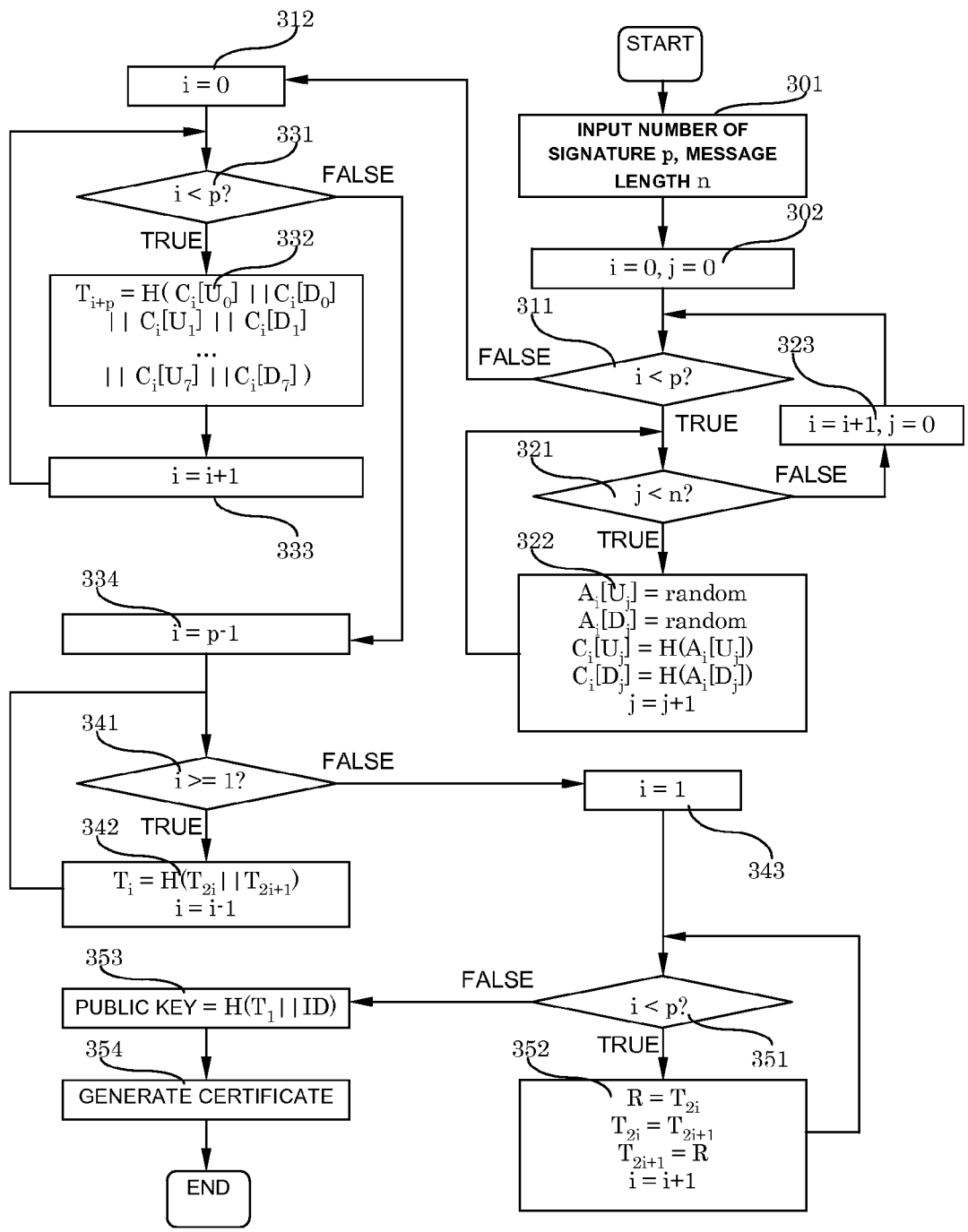
FIG. 5 is a block diagram of data initialization, according to the first embodiment of the present invention.

*Memory Initialization, FIG. 5*

Before being used, the memory units of the prover 101 must be initialized with appropriate data: the read-once memory unit 103 stores secret data blocks in the secret arrays $A_i$ 104, the encrypted arrays 111 stores the encrypted values of the secret data blocks, the tree 110 consists of encrypted data blocks combined pairwise with the hash function H, and the public key 108, which is computed from the root of the tree $T_1$ combined with some unique ID number. Since the prover 101 is essentially a memory unit, it cannot perform the calculations required by the initialization by itself; instead, all calculations are done externally, by the Certificate Authority 141. Initialization data 134 computed by the Certificate Authority is simply transmitted to the prover via the network 161, and stored on the prover's memory units.

First, in step 322, the secret arrays 104 are initialized with random data blocks: $A_i[U_0]$, $A_i[D_0]$, and so on until $A_i[U_{n-1}]$, $A_i[D_{n-1}]$ are filled with random data, generated by the Certificate Authority 141 using the random number generator unit 150. After that, the corresponding blocks of the encrypted arrays 111 are filled with the secret blocks processed by the hash function: $C_i[U_0]=H(A_i[U_0])$, $C_i[D_0]=H(A_i[D_0])$, and so on until $C_i[U_{n-1}]=H(A_i[U_{n-1}])$, $C_i[D_{n-1}]=H(A_i[D_{n-1}])$, using the hash function unit 149. Again, these computations are performed by the Certificate Authority 141; once all data blocks are ready, they are transmitted from the Certificate Authority to the prover 101 via the network 161.

After the secret arrays 104 and encrypted arrays 111 are filled, the tree data must by initialized. First, the p leaves $T_p, \ldots, T_{2p-1}$ of the tree are prepared by the Certificate Authority 141, where each leaf is related to one encrypted array. More precisely, in step 332, the 2n data blocks stored in the encrypted array $C_i$ are concatenated, and processed by the hash function module 149:

$$T_{i+p}=H(C_i[U_0]||C_i[D_0]||C_i[U_1]||C_i[D_1]||\ldots||C_i[U_{n-1}]||C_i[D_{n-1}]),$$

where X||Y denotes the concatenation of two bit strings. Now that the leaves of the tree $T_p, \ldots, T_{2p-1}$ are ready, the remaining nodes of the tree can be calculated in step 342. In fact, the remaining nodes in the tree are simply computed by hashing the two children of this node: node $T_i$ has two children $T_{2i}$ and $T_{2i+1}$, and therefore the value of block $T_i$ is $H(T_{2i}||T_{2i+1})$, computed by the hash function module 149. However, this arrangement of the tree is not convenient for generating authentication tokens later, therefore all pairs of tree blocks are exchanged: $T_{2i}$ is replaced with $T_{2i+1}$, and $T_{2i+1}$ with $T_{2i}$ in step 352. Once all tree blocks are processed, they can be transmitted from the Certificate Authority 149 the prover 101 via the network 161.

Then, in step 353, the public key 108 of the prover 101 is computed from the root of the tree $T_1$ and some identification number 112 which uniquely identifies the prover. This ID number can be a product ID, or in case the prover stores some digital contents, it can be the bit value of the digital contents. In any case, the public key is defined as $H(T_1||ID)$, and is stored in the read-only memory unit 105. After that, the Certificate Authority issues a certificate 109 of the public key 108, where the certificate includes a digital signature of this public key, and sends it to the prover 101. The certificate 109 is stored in the read-only memory unit. Finally, the counter 107 in the read-write memory unit 106 is initialized to zero.

Figure 6:
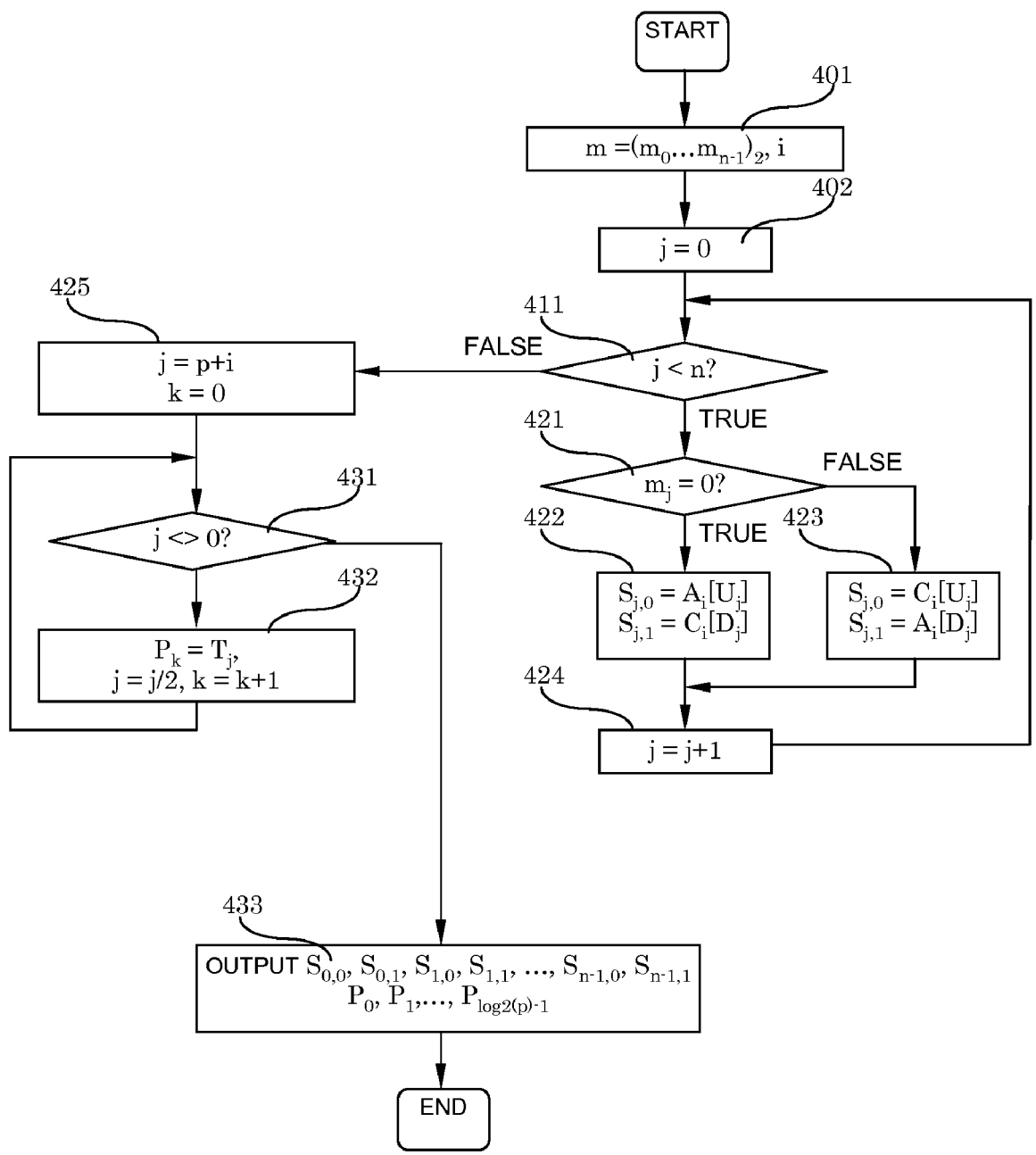
FIG. 6 is a block diagram of signature generation, according to the first embodiment of the present invention.

*Signature Generation, FIG. 6*

Recall that in the authentication process, in step 231, a signature 163 of a random challenge 164 is generated by the prover 101. In the following, we explain how the signature is generated. The random challenge consists of n bits $m=(m_0 \ldots m_{n-1})_2$, and is sent from the verifier 121 to the prover 101 via the network 161. After receiving the challenge, the prover retrieves the value of the counter 107, called i in FIG. 4. This counter activates one of the secret arrays $A_i$, and the corresponding encrypted array $C_i$. Then, the bits $m_j$ of the challenge m are scanned, and in steps 421 through 424, 2n signature blocks will be generated: $S_{0,0}, S_{0,1}, \ldots, S_{j,0}, S_{j,1}, \ldots, S_{n-1,0}, S_{n-1,1}$, where each signature block either comes from the secret array $A_i$ 104 or the encrypted array $C_i$ 111. To generate the signature, the prover will simply select and reveal data from the arrays 104 and 111: no computation is necessary. More precisely:

if the message bit $m_j$ is 0, the signature block $(S_{j,0}, S_{j,1})$ is $(A_i[U_j], C_i[D_j])$ in step 422, if the message bit $m_j$ is 1, the signature block $(S_{j,0}, S_{j,1})$ is $(C_i[U_j], A_i[D_j])$, in step 423.

Note that in both steps 422 and 423, only one of $A_i[U_j]$ and $A_i[D_j]$ is transmitted in the signature 163. However, by property of the read-once memory 103, they are both destroyed. The point of this technique is that for one message bit, only one secret data block is revealed: either $A[U_j]$ or $A[D_j]$, and signatures cannot be forged since one of the secret data blocks remains secret after signing.

After the values for $(S_{j,0}, S_{j,1})$ are chosen, log2(p) blocks must be selected from the tree table 110, where log2(p) is the logarithm in base 2 of the number of signature p, rounded up to the closest integer. The first tree block to be selected is $P_0=T_j$ with $j=p+i$ in step 432, and then j is iteratively divided by two until log2(p) tree blocks are selected. Finally, the signature $(S_{0,0}, \ldots, S_{n-1,1}, P_0, \ldots, P_{log2(p)-1})$ 163 is sent to the verifier 121 through the network in step 433.

Figure 7:
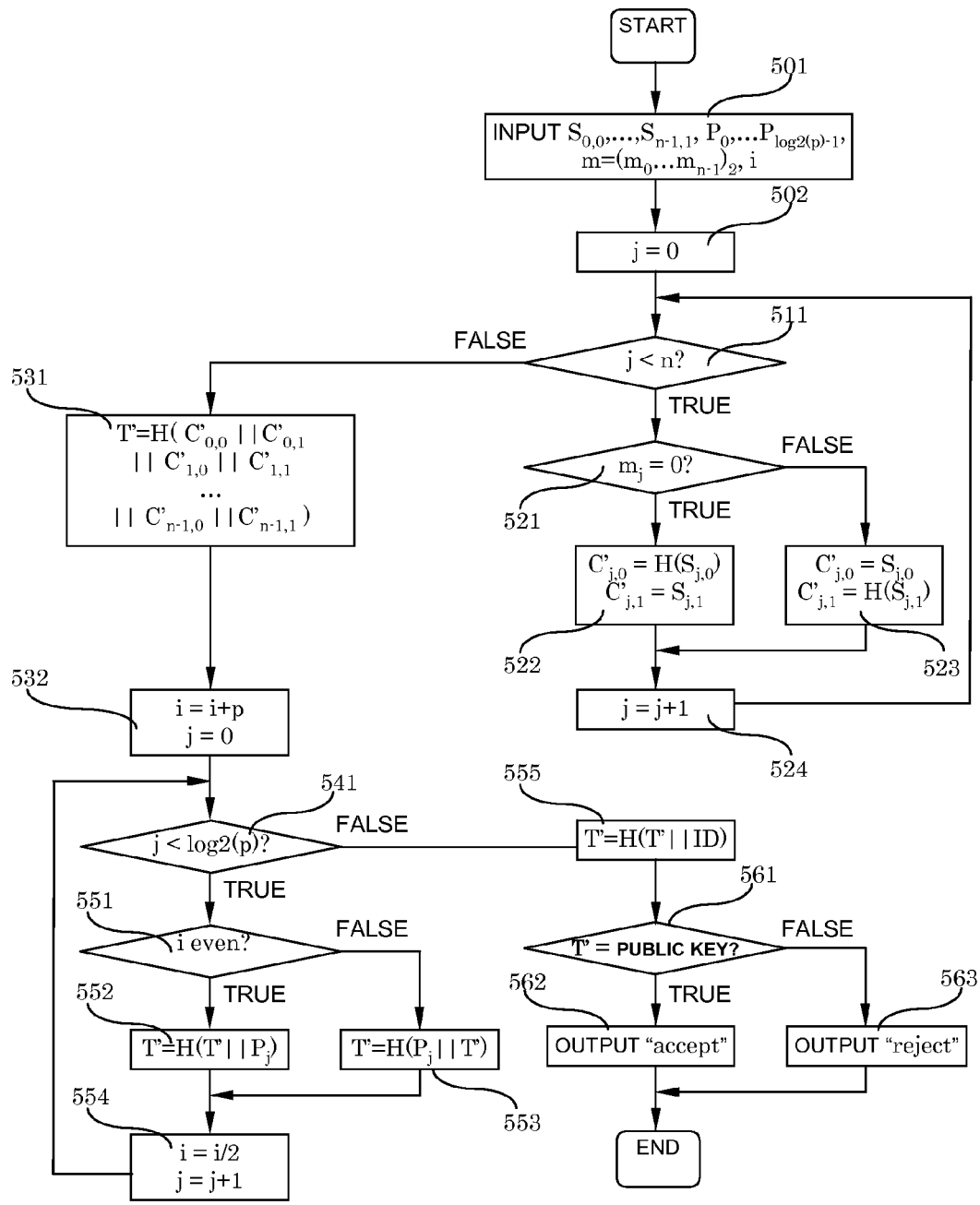
FIG. 7 is a block diagram of signature verification, according to the first embodiment of the present invention.

*Signature Verification, FIG. 7*

After the prover 101 has finished computing the signature of the random challenge 164, it sends back the signature 163 to the verifier 121. At this point, in step 241, the verifier must verify the signature $(S_{0,0}, \ldots, S_{n-1,1}, P_0, \ldots, P_{log2(p)-1})$ 163 of the n-bit challenge $m=(m_0 \ldots m_{n-1})_2$ 164. In the following, we explain how to verify the signature.

First, in steps 522 and 523, the verifier re-computes all data blocks of the encrypted array $C_i$ 111, where i is the counter 107 sent to the verifier at the beginning of the authentication protocol in step 211. More precisely, the challenge bits $m_0, \ldots, m_{n-1}$ are scanned, and if $m_j$ is zero, $C'_{j,0}$ is computed as $H(S_{j,0})$ in step 522, using the hash function module 129, whereas $C'_{j,1}$ is assigned with the signature block $S_{j,1}$. Indeed, if the challenge bit $m_j$ is zero, in step 422, the signature blocks $S_{j,0}$ and $S_{j,1}$ were selected as $A_i[U_j]$ and $C_i[D_j]$, respectively. Therefore, if the signature was correctly generated by the prover in step 231, $C'_{j,0}$ should be equal to $C_i[U_j]$ and $C'_{j,1}$ should be equal to $C_i[D_j]$. Similarly, if the challenge bit $m_j$ is one, the signature block $S_{j,0}$ is copied in $C'_{j,0}$, and $C'_{j,1}$ is set with $H(S_{j,1})$.

After all pairs $(C'_{j,0}, C'_{j,1})$ are ready, the tree data block T' is computed in step 531. In fact, all $C'_{j,b}$ values are concatenated, and hashed with the hash function H 129 in step 531:

$$T'=H(C'_{0,0}||C'_{0,1}||C'_{1,0}||C'_{1,1}||\ldots||C'_{n-1,0}||C'_{n-1,1})$$

If the signature was corrected generated by the prover in step 231, the value of T' should match the value of a tree block from the tree data 110, namely the sibling of $P_0$, which was selected in step 432 in the signature generation. Therefore, this node can be combined with the signature block $P_0$, in order to compute the parent node in the tree 110. More precisely, the counter i is set as i+p in step 532, where the value of the counter i 107 was received from the prover 101 in step 211, along with the public key and the certificate. If i is even, T' is updated with $H(T'||P_0)$ in step 552 using the hash function module 129, otherwise T' is updated with $H(P_0||T')$ in step 553. Now, if the signature was correctly generated, T' should contain the parent node of the previous T' and $P_0$, which is also the sibling of signature block $P_1$. Next, the same procedure is iterated for $P_1, P_2, \ldots, P_{log2(p)-1}$, and after each iteration, the value of T' should match the value of some tree data block, each time one level closer to the root. Finally, T' should contain the value of the root $T_1$, and in step 555, the public key 108 of the prover 101 can be recomputed with the operation $H(T'||ID)$, where ID is the identifier 112 of the prover. If the public key matches the result of the operation $H(T'||ID)$, the signature is accepted in step 562, otherwise the signature is rejected in step 563.

Figure 8:
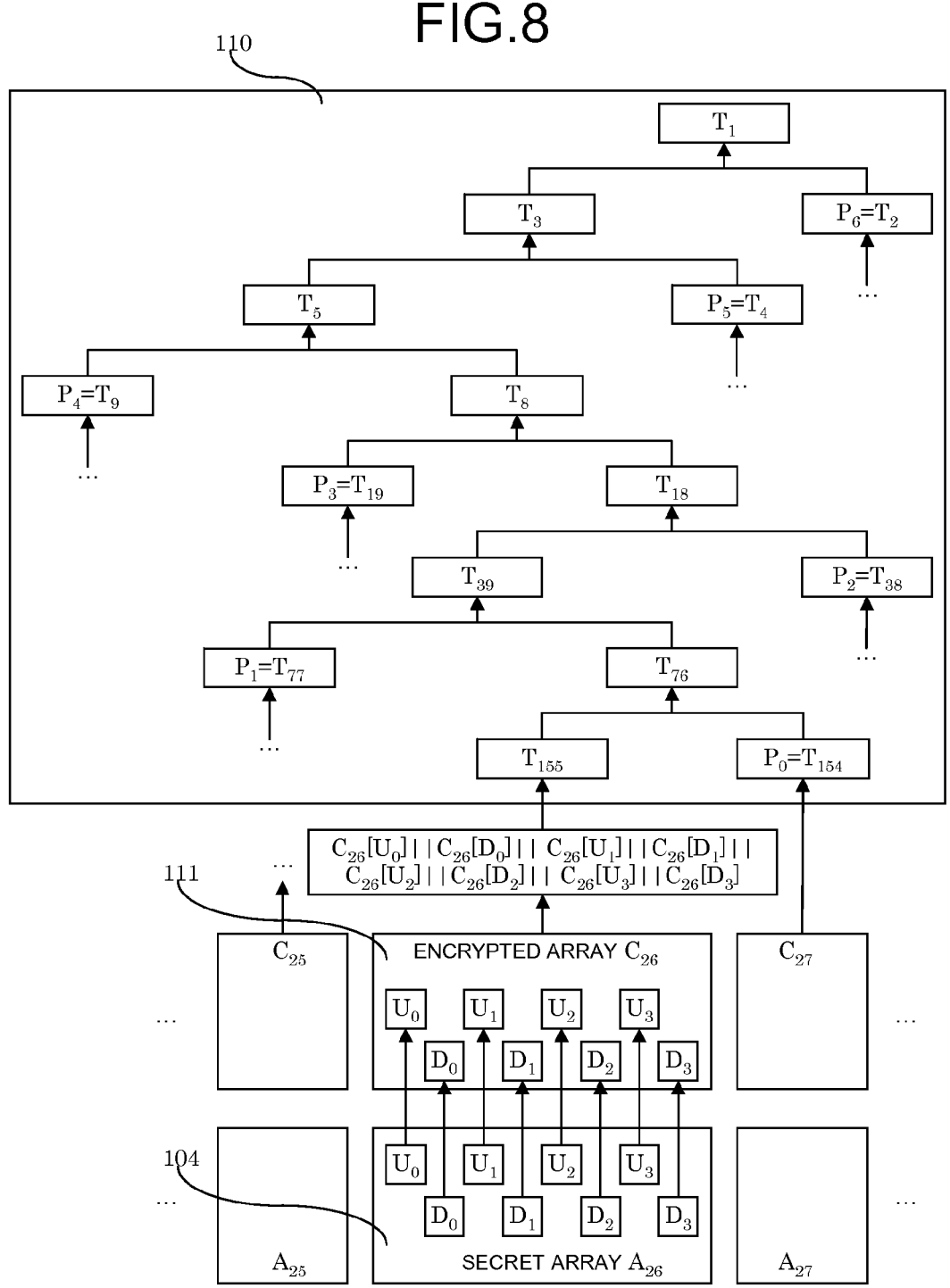
FIG. 8 is a view for showing an example of data diagram, according to the first embodiment of the present invention.

*Example, FIG. 8*

FIG. 8 shows how data is organized when p=128 signatures can be signed and the challenge has n=4 bits. There are 128 secret arrays $A_0, \ldots, A_{127}$, and 128 corresponding encrypted arrays $C_0, \ldots, C_{127}$. Each array has 8 data blocks $U_0, U_1, U_2, U_3$ and $D_0, D_1, D_2$ and $D_3$, and $C_i[U_j]=H(A_i[U_j])$, and similarly, $C_i[D_j]=H(A_i[D_j])$. Assuming that the hash function used at data initialization is MD5, h=128 bits and each data block has 128 bits as well.

The leaves $T_{128}, \ldots, T_{255}$ of the tree data 110 are initially computed as:

$$T_{128+i}=H(C_i[U_0]||C_i[D_0]||C_i[U_1]||C_i[D_1]||C_i[U_2]||C_i[D_2]||C_i[U_3]||C_i[D_3]).$$

For instance:

$$T_{154}=H(C_{26}[U_0]||C_{26}[D_0]||C_{26}[U_1]||C_{26}[D_1]||C_{26}[U_2]||C_{26}[D_2]||C_{26}[U_3]||C_{26}[D_3]).$$

Next, the parent nodes are computing by hashing the two children: $T_i=H(T_{2i}||T_{2i+1})$. For instance, $T_{77}=H(T_{154}||T_{155})$. However, after all nodes in the tree have been computed, from $T_{255}$ down to $T_1$, nodes are exchanged two by two to facilitate signature generation: $T_2$ is exchanged with $T_3$, $T_4$ is exchanged with $T_5$ and so on. In particular, $T_{154}$ and $T_{155}$ are exchanged.

There are 128 secret arrays with 8 data blocks of 128 bits, therefore, the read-once memory unit 103 has a capacity of 16 Kbytes. Similarly, there are 128 encrypted arrays with 8 data blocks of 128 bits, and 255 tree nodes of 128 bits, therefore the read-only memory unit 105 requires 20 Kbytes to store these elements. But in addition to that, the read-only memory unit must also store the public key 108 and its certificate 109.

Now, we describe the signature generation phase. Suppose that the counter 107 is set to 26: the arrays $A_{26}$ and $C_{26}$ are activated for generating a signature. Assume for instance that the 4-bit challenge to sign is $m=(1001)_2$. The first bit is one, therefore the corresponding signature blocks are $C_{26}[U_0], A_{26}[D_0]$. The second bit is zero, therefore the corresponding signature blocks are $A_{26}[U_1], C_{26}[D_1]$, and so on. Finally, the first part of the signature of challenge $(1001)_2$ is:

$$(S_{0,0}, S_{0,1}, S_{1,0}, S_{1,1}, S_{2,0}, S_{2,1}, S_{3,0}, S_{3,1}) = (C_{26}[U_0], A_{26}[D_0], A_{26}[U_1], C_{26}[D_1], A_{26}[U_2], C_{26}[D_2], C_{26}[U_3], A_{26}[D_3]).$$

Next, nodes from the tree must be selected to authenticate the first blocks of the signature to the public key. The first node to be selected is $P_0 = T_{p+26} = T_{154}$, which is the sibling node of $T_{155} = H(C_{26}[U_0] || \ldots || C_{26}[D_3])$. The next node is $P_1 = T_{154/2} = T_{77}$, sibling of $T_{76}$, which is the parent node of $T_{155}$ and $T_{154}$. The procedure is iterated up to $P_6 = T_2$.

After that, we describe signature verification. The verifier initially received the public key 108 and the counter value 107, which is i=26 in our example. Upon receiving the signature $(S_{0,0}, \ldots, S_{3,1})$, the verifier recomputes all data blocks from the encrypted array $C_{26}$ using the hash function module 129. Since the first challenge bit is 1, the verifier computes $(C'_{0,0}, C'_{0,1}) = (S_{0,0}, H(S_{0,1}))$. For the second challenge bit, which is zero, the verifier computes $(C'_{1,0}, C'_{1,1}) = (H(S_{1,0}), S_{1,1})$, and so on. After all challenge bits are processed, the verifier obtains the following array:

$$(C'_{0,0}, C'_{0,1}, C'_{1,0}, C'_{1,1}, C'_{2,0}, C'_{2,1}, C'_{3,0}, C'_{3,1}) = (S_{0,0}, H(S_{0,1}), H(S_{1,0}), S_{1,1}, H(S_{2,0}), S_{2,1}, S_{3,0}, H(S_{3,1})).$$

If the signature was correctly generated by the prover, this array should have the same data blocks as the encrypted array $C_{26}$. Indeed, it can be seen that $(S_{0,0}, S_{0,1}) = (C_{26}[U_0], A_{26}[D_0])$, and therefore:

$$(C'_{0,0}, C'_{0,1}) = (C_{26}[U_0], H(A_{26}[D_0])) = (C_{26}[U_0], C_{26}[D_0])$$

A similar observation can be made for other signature blocks. Although the verifier can recompute the encrypted array, he has no way to know whether the encrypted array really is the same as the original encrypted array from the prover, or whether the encrypted array is authentic. Therefore, the verifier uses the remaining signature blocks, namely the tree blocks, in order to authenticate the encrypted array to the public key 108.

First, the verifier computes $T' = H(C'_{0,0}||C'_{0,1}||C'_{1,0}||C'_{1,1}||C'_{2,0}||C'_{2,1}||C'_{3,0}||C'_{3,1})$ using the hash function module 129. If the signature was correctly generated, T' should be equal to the tree node $T_{155}$ (recall that $T_{154}$ and $T_{155}$ have been exchanged in the data initialization stage). He can now combine $P_0$ and T'; first the counter i is set to i+p=154. Since i=154 is even, the verifier computes $T' = H(T'||P_0)$ with the hash function module 129. Indeed, if the signature was correctly generated, $T' = T_{155}$ and $P_0 = T_{154}$, therefore the updated value of T' should be the parent node $T_{76}$. Next i is divided by 2 and becomes i=77. Since i=77 is odd, $T' = H(P_1||T')$. Again, if the signature was correctly generated, the updated value of T' should be the parent node $T_{39}$. After all tree blocks up to $P_6$ have been utilized, if the signature was correct, the verifier should have computed $T' = T_1$, root of the tree. From there, the verifier simply checks whether $H(T'||ID)$ matches the value of the public key 108.

Finally, we discuss the security of this construction. For one message bit $m_j$, the corresponding signature part is either $A_i[U_j], C_i[D_j]$ or $C_i[U_j], A_i[D_j]$. In both cases, the secret blocks $A_i[U_j], A_i[D_j]$ are destroyed, and therefore, one of them remains secret since one of them has not been revealed. As a consequence, a different message bit cannot be signed since it would require the knowledge of the secret block which has not been revealed. For instance, if the message bit is $m_j=0$, forging a signature for $m_j=1$ implies finding $A_i[D_j]$ such that $C_i[D_j] = H(A_i[D_j])$. This task is called finding a pre-image X such that for given Y, Y=H(X), and by property of the hash function, this is infeasible.

In a different approach, one could try to inject a different secret array $A'_i$ which authenticates to the root of the tree $T_1$. In that case, the lower part of the tree would be different from the real tree, for instance $T'_{i+p} \neq T_{i+p}$, but at some point the two trees become identical since they share the same root. This implies that for some node index j, we have $(T'_{2j}, T'_{2j+1}) \neq (T_{2j}, T_{2j+1})$, but $T'_{j=Ti}$, where $T_j = H(T_{2j}||T_{2j+1})$ and $T'_j = H(T'_{2j}||T'_{2j+1})$. Values X,X' such that $H(X) = H(X')$ are called collisions, and by property of the hash function, it is infeasible to find such collisions. Therefore, the only way to forge a signature is to observe interactions between the real prover and the verifier, and gather signatures from the prover. Next, when engaging in the authentication protocol, if for the same counter value i, the verifier sends the same challenge as in the case of the real prover, the forger can use the corresponding collected signature. As a consequence, the probability to forge a signature is $1/2^n$, where n is the security parameter. If n=20 bits for the challenge size, this probability is about one chance over one million.

*Extensions*

The scope of this patent is not limited to the above embodiment. For instance, system parameters such as the usability parameter p, number of signatures, or security parameter n, size of the challenge, can take any appropriate integer value. For high-security systems n should be large, typically more than 20 bits, resulting in large memory requirements for the prover. For lightweight authentication systems, n can be chosen small, for example 8 bits, and the forger will have a probability of 1/256 to forge a signature, which is not very different from the security provided by PIN codes on smartcards and acceptable in some situations.

The hash function can be arbitrarily chosen: it can be MD5, which has an output size of 128 bits, or SHA1, or any other hash function.

The memory units of the prover can be implemented in several ways. Strictly speaking, the memory unit 105 can be any type of memory, including read-write memory. Therefore, it can be implemented as ROM, PROM, EEPROM, flash memory or any memory support. As for the read-once memory unit 103, it can be a truly read-once memory unit such as the fuse-based memory described in Patent Literature 1, FeRAM memory or any other read-once memory, but this functionality can be emulated with a standard memory unit such as EEPROM of flash memory and a memory controller which erases contents upon reading.

Finally, it is straight-forward to modify the authentication system into a digital signature system, where the message 164 is generated and signed by the prover 101, and verified by the verifier 121.

<Embodiment 2> Authentication for Printer Cartridges

Figure 9:
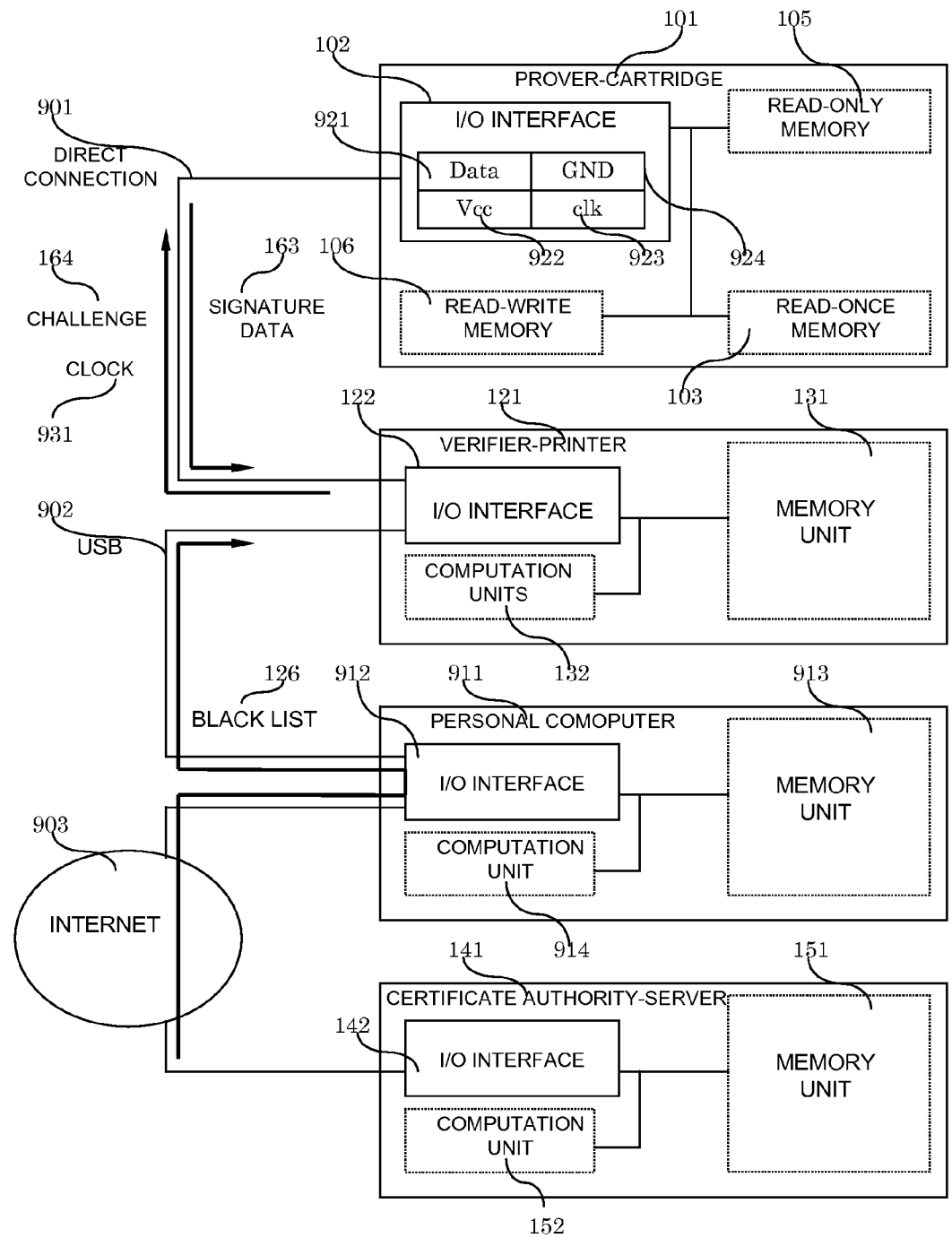
FIG. 9 is a hardware diagram of an authentication system for printer cartridge, according to a second embodiment (Embodiment 2) of the present invention.

*Authentication System for Printer Cartridges, FIG. 9*

The system consists of a verifier chip 121 and a prover chip 101. In our embodiment, a printer is equipped with the verifier chip, whereas ink cartridges are equipped with the prover chip. Regular cartridges can be purchased in stores, but also rogue cartridges manufactured by competitors, or refill kits. Therefore, legit cartridges should:

authenticate to the printer in order to forbid the use of rogue cartridges, be used a limited number of times to avoid refills.

The cartridge 101 and the printer 121 are in direct contact and can exchange data through a direct connection 901. The exchanged data can be related to traditional printing functionalities, such as checking ink levels, but also authentication data, including a challenge 164 and signature 163.

The printer 121 is coupled to a personal computer 911 via a cable 902, USB for instance. The personal computer is equipped with an input/output interface 912, with USB and LAN connectors for instance, memory units 913 and computation units 914, and possibly some other peripherals or units. Through the cable 902, the personal computer can send printing requests or any data related to traditional printing functionalities, but can also forward the black list 126. Indeed, the personal computer 911 is coupled to the Certificate Authority via Internet 903; the Certificate Authority can send firmware or software updates to the printer 121 via the personal computer 911, and in the same time, send an updated black list.

The Certificate Authority is a webserver coupled to the Internet 903, managed by the printer company. Unlike the case of the first embodiment, there is no persistent and direct connection between the Certificate Authority 141 and the cartridge 101, therefore, data initialization cannot be performed remotely. Instead, the memory units 103, 105 and 106 of the cartridge are initialized when the cartridge is manufactured. At this time, the cartridge can be physically coupled to the Certificate Authority 141, or possibly and preferably to a dedicated computer which is not coupled to the Internet in order to avoid security breaches that could leak the secret arrays 104 of many cartridges.

The printer 121 and the cartridge 101 are autonomous, and authentication can be performed without accessing any external network; in particular, the printer does not need a persistent and direct connection to the Internet or to the Certificate Authority. By simply using the locally stored Certificate Authority's public key 125, the printer can authenticate legit cartridges, thanks to the authentication mechanism described in Embodiment 1. Authentication can be performed at regular time intervals, according to the security policy of the printer company. For instance, it can be performed for every printing request, at booting time or every day. How the printer behaves in case of failed authentication is also determined by the security policy of the printer company. One possibility could be that the printer refuses printing requests for a few minutes. Therefore, even when the security parameter is not very high, say for instance n=8-bit challenges, leading to a forgery probability of 1/256, in practice, if the printer stays idle for about one minute in case of failed authentication, usability is greatly damaged when using rogue cartridges.

In Embodiment 2, the security parameter is n=8 bits for the message size, the hash function is MD5 with output size h=128 bits, and the number of signatures p=1024.

In this case, the read-once memory stores about 260 Kbytes of data for the secret arrays 104, whereas the read-only memory requires 260 Kbytes for the encrypted arrays 111 and 32 Kbytes for the tree data 110. The public key 108 is just one hash value, therefore 16 bytes, the certificate can be an RSA signature of 1024 bits, therefore 128 bytes and the ID 112 a product number coded on 4 bytes. In total, less than 300 Kbytes are required for the read-only memory. Finally, the counter 107 is a 1024-count counter, and occupies 2 bytes of read-write memory.

The read-once memory unit 103 will be discussed in details later; the read-only memory unit 105 is implemented as PROM and the read-write memory unit 106 as EEPROM. As for the input-output interface 102, it is a simple connector with a serial data input/output pin 921, a power supply pin 922, a ground pin 923 and a clock pin 924.

Figure 10:
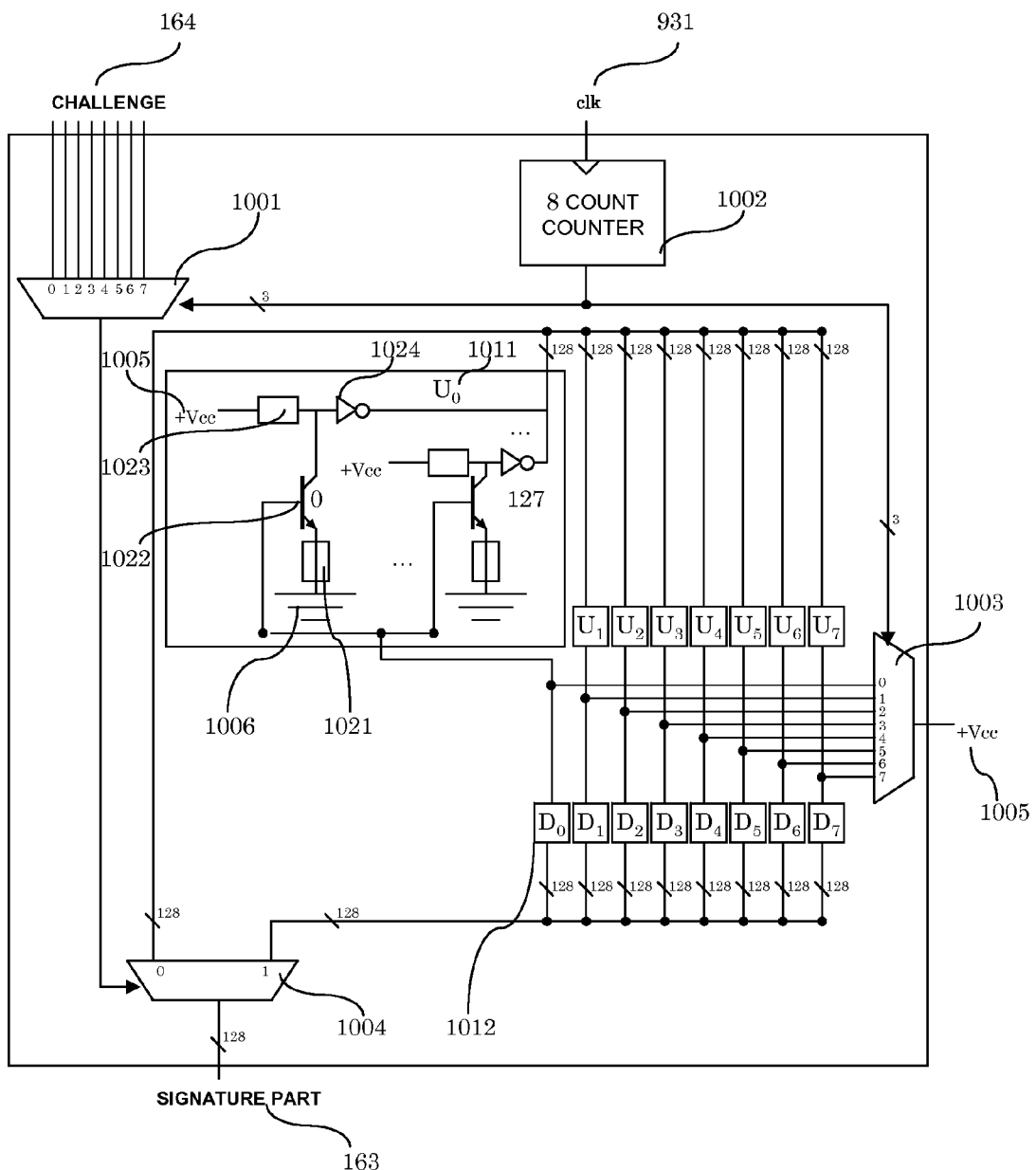
FIG. 10 is a hardware diagram of read-once array, according to the second embodiment of the present invention.

*Read-Once Array, FIG. 10*

The secret arrays $A_i$ 104 storing the secret data blocks $U_j$ and $D_j$ is at the heart of the authentication mechanism. Since one pair $(U_j, D_j)$ must be used only once, data is erased after being accessed. In our Embodiment 2, the read-once memory is implemented with fuses 1021; more precisely, one fuse stores one data bit. A fuse has two states: melted, corresponding to the bit value 0, and not melted, corresponding to the bit value 1. In addition, when current goes through a fuse, it melts and the corresponding bit is irrevocably set to the value 0.

Now, we describe the secret array 104 in details. Each array $A_i$ has two input signals: the 8-bit challenge 164, and a clock signal 931. Each array also has one output, part of the signature 163. The 8-count counter 1002 counts from 0 to 8, and its output controls the multiplexer 1001 and the demultiplexer 1003. The multiplexer 1001 selects one of the 8 challenge bits according to the value of the counter 1002; for example, 1 selects bit 1 of the challenge. The demultiplexer 1003 propagates the input Vcc signal 1005 to one of the 128-bit memory cells 1011 $U_0, \ldots, U_7$ and one of the 128-bit memory cells 1012 $D_0, \ldots, D_7$ according to the value of the counter 1002. For example, 1 propagates Vcc to $U_1$ and $D_1$. Each memory cell $U_j$ or $D_j$ stores 128 bits and contains 128 fuses 1021: a melted fuse stores the bit value 0 whereas a non-melted fuse stores the bit value 1.

Recall that the counter 1002 activates one of the memory cells $U_j$ and one of the memory cells $D_j$. Both memory cells forward their 128-bit memory contents to the multiplexer 1004. Recall that the counter 1002 selected one of the challenge bits $m_j$, too. The value of this challenge bit is forwarded to the multiplexer 1004, and is used to select either $U_j$ or $D_j$: if the challenge bit is $m_j=0$, the signature part is $U_j$, and if the challenge bit is $m_j=1$, the signature part is $D_j$.

Next, we describe one memory cell $U_0$ 1011; the other cells are essentially the same. If the counter 1002 is zero, the input Vcc is forwarded to all of the 128 transistors 1022, which act as closed switches. If for one given transistor, the corresponding fuse 1021 is melted, the voltage on the right and left hand side of the resistor 1023 is non-zero. Thus, the right hand side of the inverter 1024 has voltage 0, which corresponds to the bit value 0.

On the other hand, if the fuse 1021 is not melted, the right side of the resistor 1021 is coupled to the ground signal 1006 and the voltage on the right side of the transistor is zero. Thus, the right hand side of the inverter 1024 has voltage Vcc, which corresponds to the bit value 1. However, in this case, current flows through the fuse 1021, which melts down after some time, and the corresponding bit data is irrevocably set to zero. Thus, data is always erased after accessing it.

If initially, the input Vcc was not forwarded to the 128 transistors by the demultiplexer 1003, they all act as open switches, and the voltage on the right hand side of all inverters is zero, therefore, the memory cell $U_0$ will not transmit its memory contents unless it is activated by the demultiplexer 1003.

*Extensions*

The scope of this patent is not limited to the above embodiment; in particular, a similar system can be used for other applications. For instance, the authentication system described in Embodiment 2 could be used for verifying the compliance of replacement parts. A typical example is laptop batteries: many laptop users have experienced damaged laptops due to replacement batteries that were not compliant with their laptops. By using the described authentication system, the laptop manufacturers could issue digital certificates to laptops batteries that are compliant with their products and can be safely used. And of course, the described authentication system can be implemented with different security and usability parameters, a different hash function and different memory supports.

<Embodiment 3> DRM for Digital Contents on a Memory Card

In our third embodiment, we show how our invention can be used for protecting digital contents stored on a memory support, and especially a flash memory based card such as an SD card. Since the memory type does not support read-once access by default, a simple memory controller must emulate this functionality: upon reading some specific memory segments, the contents that have been read are destroyed.

*Video Game Console and Video Game, FIG. 11*

In our third embodiment, the prover is a memory card with software stored on it, typically a video game 1126. The video game software 1126 can be executed by the verifier, a video game console 121. The video game and the console are in direct contact 1101: the memory card has some pins, including data pins 1121, power supply pin 1122, a clock pin 1123 and a ground pin 1124. Access to the flash memory unit 1127 is managed by a memory controller 1125, which regulates access rights: the memory segment 105 storing encrypted arrays, tree data, public key and certificate has read-only access, the memory segment 106 storing the counter has read-write access, and the memory segment 103 storing the secret arrays has read-once access: secret arrays are erased by the memory controller 1125 after being read. In addition, the memory controller 1125 also implements signature generation 231, as described in FIG. 6. Similarly to previous embodiments, signing the challenge only requires accessing and possibly deleting memory.

The video game console is equipped with usual peripherals and units, including computation units 132 and memory unit 131. The input/output interface manages connections with video game memory cards 101, as well as connections to the Internet 1103, using a WiFi interface for instance. The main purpose of the console is to execute game software 1126 stored on the memory card 101.

The Certificate Authority 141 is a webserver managed by the video game company. It can issue certificates 109 for video games that are allowed to be played on consoles 121, and maintains a black list 126 of the public keys of particular memory cards 101 that have been compromised, and whose secret arrays have been revealed by hackers. Although the console 121 does not have a permanent connection to the internet 1103, it sometimes accesses it for software or firmware updates, or for online gaming. At this time, the black list 126 can be broadcasted by the Certificate Authority to all coupled consoles 121.

When a video game memory card 101 is inserted in the console 121, the game data 1126 is transferred to the console. In this scenario, the game data 1126 is also the identifier ID 112 of the memory card 101. Since the public key of the memory card 101 is defined as $H(T_1||ID)$, the game data can be authenticated by the video game console 121. The aim of our invention is to prevent unauthorized software from being executed by the console: thanks to the signature data 163, the game data 1126 can be identified as executable or not depending on the outcome of the authentication protocol described in Embodiment 1. As a consequence, malicious codes such as viruses or illegal copies cannot be run on the video game console if they fail the authentication protocol. Moreover, the Certificate Authority 141, managed by the video game company, can issue certificates to third-party game developers, who are able to develop video games that are playable on the console 121, and without revealing the Certificate Authority's private key 146 to such third parties.

In Embodiment 3, the security parameter is n=32 bits for the size of the challenge, therefore the probability to forge a signature is about one chance over four billion. In case authentication is failed several times, the console should react according to the video game company security policy. For example, the public key 108 of the memory card can be added to the black list 126, and a notification can be sent to the Certificate Authority 141 in order to update the black list of other consoles. The usability parameter is chosen as p=65, 536, so that one particular video game can be played 65,536 times. Finally, the hash function MD5, with h=128 bits. In this case, the read-once memory segment 103 requires about 67 Mbytes, the read-only segment 105 requires 69 Mbytes, and the read-write segment 106 requires 2 bytes.

*Extensions*

The scope of our patent is not limited to the above embodiment, and it is straight forward to implement similar functionalities with different parameters, a different hash function, SHA1 for instance, or different memory supports such as EEPROM or any other type of memory. In addition, the system described in Embodiment 3 can be readily used for other purposes; in particular, any type of digital contents can be digitally signed with the system: movies or music for instance. In addition, the verifier 121 can be instantiated by any type of electronic device, including but not limited to portable audio players, mobile phones or personal computers.

<Embodiment 4> Anti-Counterfeiting System with RFID Chips

Classical RFID tags are not equipped with cryptographic modules; therefore they are not well-suited for authentication or anti-counterfeiting applications. There are two main reasons why cryptographic algorithms are not implemented on such platforms. First, cryptographic applications consume a lot of energy, whereas passive tags work in very low power settings. Second, most of RFID tags only have memory and no computation unit in order to keep their manufacturing cost as low as possible.

Our fourth embodiment shows how to take advantage of the authentication mechanism described in Embodiment 1, where the read-once memory unit is instantiated by FeRAM memory, which naturally implements the read-once access functionality.

*Anti-Counterfeiting System, FIG. 12*

For brand or luxury products, counterfeiting is a growing issue, where cryptography and digital signature can certainly contribute. The typical scenario of our fourth embodiment is a control at customs, where the custom officer uses an RFID reader 121 in order to inspect suspicious items equipped with an RFID chip 101. The RFID chip can engage in an authentication protocol and prove the authenticity of the item, whereas counterfeited products will be detected when they fail to authenticate themselves. RFID chips are manufactured and initialized by the maker of the inspected item, henceforth called company. The company plays the role of the Certificate Authority and distributes the Certificate Authority's public key 125 to custom officers, but keeps the Certificate Authority's private key 146 secret, in order to avoid information leakage, for example when a reader 121 is captured by a malicious user.

The RFID chip 101 is attached to a product manufactured by the company; it is equipped with an antenna 1201 and a transponder 1202, which can capture radio waves on a given frequency, and convert them into an electric signal using magnetic induction. The electronic signal converted by the transponder transports information from the reader 121, and in the same time, is used as power source by the chip 101. By backscattering the received signal, the transponder 1202 and antenna 1201 can transmit data back to the reader 121. Therefore, the reader 121 and the RFID chip 101 are coupled by a wireless network 1211 using near field communication technology.

A memory controller 1203 governs access to the memory unit 1204, which is implemented with FeRAM (ferromagnetic Random Access Memory). Since FeRAM is by nature a read-once memory, because data is destroyed upon reading, unlike the case of Embodiment 3, the memory controller 1203 does not have to explicitly erase data. Therefore, the role of the memory controller is simply to realize access control and to implement the signature generation procedure from FIG. 4. Here again, signing is just selecting data, and no computations are necessary.

FeRAM is a non-volatile memory with characteristics that are similar to flash memory, but with several advantages, namely lower power consumption and greater number of write/erase cycles. FeRAM is currently used for some RFID applications. The FeRAM unit 1204 has at least three memory segments. The read-only segment 105 stores the ID 112, the public key 108 and its certificate 109, the tree data 110 and encrypted arrays 111. The read-write segment 106 stores the counter 107 and the read-once segment 103 stores the secret arrays 104. Since FeRAM is read-once by nature, no mechanism is necessary to implement the read-once functionality of memory segment 103. However, since data stored in the read-only segment 105 and read-write segment 106 is destroyed upon reading, it must be refreshed by a mechanism implemented in the memory controller 1203.

The chip 101 and the reader 121 can perform an authentication protocol as in FIG. 2, where the reader 121 send a random challenge 164 to the chip 101, which replies with a signature 163 of the challenge. The reader can be a PDA equipped with near field communication technology in order to communicate with RFID chips 101, and to display the result of the authentication protocol so that the custom officer can take appropriate measures in case of failure. In addition, the reader can periodically couple to the Internet 1212 for getting an updated black list 126 from the company, which contains the public keys of compromised products. However, in the case where the reader is mobile, it does not necessarily have a persistent Internet connection, and therefore the authentication protocol between the chip 101 and reader 121 can be run without any external intervention or connection to Internet 1212.

In our fourth embodiment, the security parameter is chosen as n=16 bits for the size of the challenge, and usability parameter is p=256 signatures. Therefore, one product can authenticate at most 256 times in its lifespan, and signatures can be forged with negligible probability 1/216=1/65,536. Using the hash function SHA1 and therefore hash output size h=160 bits, this leads to a capacity of about 330 Kbytes for the FeRAM unit 1204.

*Extensions*

The scope of our patent is not limited to the above embodiment, and the described system can be used in other scenarios, including but not limited to electronic passports, product tracking, electronic wallets or electronic commuter passes. A different hash function and different parameters can be used, and the system can be implemented using various memory supports such as flash memory or EEPROM.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A cryptographic system for generating digital signatures, comprising:
   (a) a memory configured to store secret data, encrypted data, authentication data and a public key;
   (b) a receiver configured to receive an input message;
   (c) a secret data extracting unit configured to extract secret data blocks from the secret data;
   (d) a data block extracting unit configured to extract encrypted data blocks from the encrypted data;
   (e) an authentication data block extracting unit configured to extract authentication data blocks from the authentication data;
   (f) a counter unit configured to update a counter; and
   (g) a sending unit configured to send a digital signature of the input message,
   wherein the digital signature includes the extracted secret data blocks, the extracted encrypted data blocks and the extracted authentication data blocks,
   wherein the secret data extracting unit is further configured to effect operations to:
   (c-1) scan one bit of the input message,
   (c-2) access a pair of secret data blocks in the secret data,
   (c-3) reveal one secret data block in the pair if the bit is zero, and reveal the other secret data block in the pair if the bit is one,
   (c-4) erase the pair from the secret data, and
   (c-5) iterate the above operations for all bits of the input message, whereby the digital signatures include the revealed secret data blocks.

2. The system recited in claim 1, wherein the secret data is organized in a plurality of secret arrays, and the secret arrays store a plurality of secret data blocks, and the secret blocks are organized in pairs, wherein only one of the secret data blocks can be accessed in the pair and both secret data blocks are destroyed upon reading the element in the pair.

3. The system recited in claim 2, which further comprises a memory controller, wherein the memory controller erases a predetermined number of the secret data blocks upon accessing the memory.

4. The system recited in claim 3, wherein the memory includes a flash memory unit.

5. The system recited in claim 3, wherein the memory includes an EEPROM memory unit.

6. The system recited in claim 2, wherein the encrypted data is organized in a plurality of encrypted arrays, and the encrypted arrays store a plurality of encrypted data blocks, and the encrypted data blocks store the secret data blocks from the secret arrays encrypted with a cryptographic processing unit.

7. The system recited in claim 6, wherein the cryptographic processing unit is a hash function unit.

8. The system recited in claim 7, wherein the authentication data is organized in a tree storing a plurality of nodes, and leaves of the tree store a predetermined number of the encrypted data blocks further encrypted with the hash function unit, and a parent node in the tree stores a predetermined number of children nodes encrypted with the hash function unit, whereby the public key is derived from the root of the tree.

9. The system recited in claim 1, wherein the memory includes an array of fuses, wherein a predetermined number of fuses are blown upon accessing the memory.

10. The system recited in claim 1, wherein the memory includes a FeRAM memory unit.

11. A method of generating digital signatures, comprising:
    (a) providing a memory configured to store secret data, encrypted data, authentication data and a public key;
    (b) receiving an input message;
    (c) extracting secret data blocks from the secret data;
    (d) extracting encrypted data blocks from the encrypted data;
    (e) extracting authentication data blocks from the authentication data;
    (f) updating a counter; and
    (g) sending a digital signature of the input message,
    wherein the digital signature includes the extracted secret data blocks, the extracted encrypted data blocks and the extracted authentication data blocks,
    wherein the extracting secret data blocks further includes operations of:
    (c-1) scanning one bit of the input message,
    (c-2) accessing a pair of secret data blocks in the secret data,
    (c-3) revealing one secret data block in the pair if the bit is zero, and revealing the other secret data block in the pair if the bit is one,
    (c-4) erasing the pair from the secret data, and
    (c-5) iterating the above operations for all bits of the input message, whereby the digital signatures include the revealed secret data blocks.

12. The method recited in claim 11, wherein the extracting secret data blocks further includes:
    (c-1) erasing the extracted secret data blocks, and
    (c-2) for each extracted secret data block, erasing at least one other secret data block.

13. The method recited in claim 11, wherein the encrypted data is initialized by encrypting all secret data blocks from the secret data with a cryptographic encryption function.

14. The method recited in claim 13, wherein the cryptographic encryption function is a hash function.

15. The method recited in claim 14, further comprising authentication including:
    (h) computing leaf nodes by hashing a predetermined number of encrypted data blocks with the hash function,
    (i) computing at least one new node by hashing a predetermined number of nodes that have been computed in the previous operation,
    (j) iterating operation b until one single node remains,
    whereby the public key of the digital signature method is derived from the last node computed by the initialization method.

* * * * *